US007474859B2

(12) United States Patent
Mahgerefteh et al.

(10) Patent No.: US 7,474,859 B2
(45) Date of Patent: Jan. 6, 2009

(54) VERSATILE COMPACT TRANSMITTER FOR GENERATION OF ADVANCED MODULATION FORMATS

(75) Inventors: Daniel Mahgerefteh, Somerville, MA (US); Xueyan Zheng, Culver City, CA (US); Yasuhiro Matsui, Lawrence, MA (US); Parviz Tayebati, Boston, MA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/784,395

(22) Filed: Apr. 6, 2007

(65) Prior Publication Data

US 2008/0025731 A1 Jan. 31, 2008

Related U.S. Application Data

(63) Continuation-in-part of application No. 11/702,436, filed on Feb. 5, 2007, and a continuation-in-part of application No. 11/441,944, filed on May 26, 2006, and a continuation-in-part of application No. 11/272,100, filed on Nov. 8, 2005, and a continuation-in-part of application No. 11/084,630, filed on Mar. 18, 2005, and a continuation-in-part of application No. 11/084,633, filed on Mar. 18, 2005, and a continuation-in-part of application No. 11/068,032, filed on Feb. 28, 2005, and a continuation-in-part of application No. 10/308,522, filed on Dec. 3, 2002.

(60) Provisional application No. 60/853,867, filed on Oct. 24, 2006, provisional application No. 60/789,863, filed on Apr. 6, 2006.

(51) Int. Cl.
*H04B 10/04* (2006.01)
*H04B 10/155* (2006.01)

(52) U.S. Cl. .................. 398/201; 398/183; 398/189; 398/190; 398/191

(58) Field of Classification Search ............ 398/183, 398/186–191, 201
See application file for complete search history.

(56) References Cited

U.S. PATENT DOCUMENTS 3,324,295 A 6/1967 Harris (Continued)

FOREIGN PATENT DOCUMENTS

GB 2 107 147 4/1983

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.

(Continued)

*Primary Examiner*—Leslie Pascal
(74) *Attorney, Agent, or Firm*—Workman Nydegger (57) ABSTRACT

A system for generating a return-to-zero differentially-phase-shift-keyed (RZ-DPSK) optical signal comprising:
 a driver comprising an N-level digital multilevel transformer (DMT) configured to receive a two level digital electrical signal representing 1s and 0s and output a N-level electrical signal, wherein N>2;
 an FM source configured to receive the N-level electrical signal output by the driver and generate an optical frequency modulated signal; and
 an optical spectrum reshaper (OSR) configured to receive the optical frequency modulated signal output by the FM source and generate the desired RZ-DPSK optical signal. A method for generating a return-to-zero differentially-phase-shift-keyed (RZ-DPSK) optical signal, the method comprising:
 (1) receiving a two level digital electrical signal representing 1s and 0s and outputting a N-level electrical signal, wherein N>2;
 (2) receiving the N-level electrical signal output and generating an optical frequency modulated signal; and
 (3) receiving the optical frequency modulated signal and generating the desired RZ-DPSK optical signal.

38 Claims, 4 Drawing Sheets

Progression of data through components of the transmitter chain

Schematic of the Chirp Managed Laser based RZ-DPSK Transmitter

U.S. PATENT DOCUMENTS

| Number | Date | Inventor |
|---|---|---|
| 3,999,105 A | 12/1976 | Archey et al. |
| 4,038,600 A | 7/1977 | Thomas |
| 4,561,119 A | 12/1985 | Epworth |
| 4,805,235 A | 2/1989 | Henmi |
| 4,841,519 A | 6/1989 | Nishio |
| 5,293,545 A | 3/1994 | Huber |
| 5,325,378 A | 6/1994 | Zorabedian |
| 5,371,625 A | 12/1994 | Wedding et al. |
| 5,412,474 A | 5/1995 | Reasenberg et al. |
| 5,416,629 A | 5/1995 | Huber |
| 5,465,264 A | 11/1995 | Buhler et al. |
| 5,477,368 A | 12/1995 | Eskildsen et al. |
| 5,550,667 A | 8/1996 | Krimmel et al. |
| 5,592,327 A | 1/1997 | Gabl et al. |
| 5,737,104 A | 4/1998 | Lee et al. |
| 5,777,773 A | 7/1998 | Epworth et al. |
| 5,805,235 A | 9/1998 | Bedard |
| 5,856,980 A | 1/1999 | Doyle |
| 5,920,416 A | 7/1999 | Beylat et al. |
| 5,953,139 A | 9/1999 | Nemecek et al. |
| 5,974,209 A | 10/1999 | Cho et al. |
| 6,081,361 A | 6/2000 | Adams et al. |
| 6,096,496 A | 8/2000 | Frankel |
| 6,104,851 A | 8/2000 | Mahgerefteh |
| 6,115,403 A | 9/2000 | Brenner et al. |
| 6,222,861 B1 | 4/2001 | Kuo et al. |
| 6,271,959 B1 | 8/2001 | Kim et al. |
| 6,298,186 B1 | 10/2001 | He |
| 6,331,991 B1 | 12/2001 | Mahgerefteh |
| 6,359,716 B1 | 3/2002 | Taylor |
| 6,473,214 B1 * | 10/2002 | Roberts et al. ............... 398/183 |
| 6,506,342 B1 | 1/2003 | Frankel |
| 6,563,623 B1 | 5/2003 | Penninckx et al. |
| 6,577,013 B1 | 6/2003 | Glenn et al. |
| 6,618,513 B2 | 9/2003 | Evankow, Jr. |
| 6,654,564 B1 | 11/2003 | Colbourne et al. |
| 6,665,351 B2 | 12/2003 | Hedberg |
| 6,687,278 B1 | 2/2004 | Mason et al. |
| 6,748,133 B2 | 6/2004 | Liu et al. |
| 6,778,307 B2 | 8/2004 | Clark |
| 6,810,047 B2 | 10/2004 | Oh et al. |
| 6,834,134 B2 | 12/2004 | Brennan et al. |
| 6,836,487 B1 | 12/2004 | Farmer et al. |
| 6,847,758 B1 | 1/2005 | Watanabe |
| 6,947,206 B2 | 9/2005 | Tsadka et al. |
| 6,963,685 B2 | 11/2005 | Mahgerefteh et al. |
| 7,013,090 B2 | 3/2006 | Adachi et al. |
| 7,054,538 B2 | 5/2006 | Mahgerefteh et al. |
| 7,076,170 B2 | 7/2006 | Choa |
| 7,123,846 B2 | 10/2006 | Tateyama et al. |
| 7,263,291 B2 | 8/2007 | Mahgerefteh et al. |
| 7,280,721 B2 | 10/2007 | McCallion et al. |
| 2002/0154372 A1 | 10/2002 | Chung et al. |
| 2002/0159490 A1 | 10/2002 | Karwacki |
| 2002/0176659 A1 | 11/2002 | Lei et al. |
| 2003/0002120 A1 | 1/2003 | Choa |
| 2003/0067952 A1 | 4/2003 | Tsukiji et al. |
| 2003/0099018 A1 | 5/2003 | Singh et al. |
| 2003/0147114 A1 | 8/2003 | Kang et al. |
| 2003/0193974 A1 | 10/2003 | Frankel et al. |
| 2004/0008933 A1 | 1/2004 | Mahgerefteh et al. |
| 2004/0008937 A1 | 1/2004 | Mahgerefteh et al. |
| 2004/0036943 A1 | 2/2004 | Freund et al. |
| 2004/0076199 A1 | 4/2004 | Wipiejewski et al. |
| 2004/0096221 A1 | 5/2004 | Mahgerefteh et al. |
| 2004/0218890 A1 | 11/2004 | Mahgerefteh et al. |
| 2005/0100345 A1 | 5/2005 | Welch et al. |
| 2005/0111852 A1 | 5/2005 | Mahgerefteh et al. |
| 2005/0175356 A1 | 8/2005 | McCallion et al. |
| 2005/0206989 A1 | 9/2005 | Marsh |
| 2005/0271394 A1 * | 12/2005 | Whiteaway et al. ......... 398/188 |
| 2005/0286829 A1 | 12/2005 | Mahgerefteh et al. |
| 2006/0002718 A1 | 1/2006 | Matsui et al. |
| 2006/0018666 A1 | 1/2006 | Matsui et al. |
| 2006/0029358 A1 | 2/2006 | Mahgerefteh et al. |
| 2006/0029396 A1 | 2/2006 | Mahgerefteh et al. |
| 2006/0029397 A1 | 2/2006 | Mahgerefteh et al. |
| 2006/0228120 A9 | 10/2006 | McCallion et al. |
| 2006/0233556 A1 | 10/2006 | Mahgerefteh et al. |
| 2006/0274993 A1 | 12/2006 | Mahgerefteh et al. |

FOREIGN PATENT DOCUMENTS

| | | |
|---|---|---|
| WO | 9905804 | 2/1999 |
| WO | 0104999 | 1/2001 |
| WO | 03005512 | 7/2002 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chriping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Perfromance of Dispersion-Supported and Dispersion-Mediated Nonlinearity-Enhanced Transmission, Electronics Letters, Jun. 9, 1994, 988, vol. 30, No. 12.

LI. Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 199, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Change-Hee et al., Transmission of Directly Modulated 2.5-Gbb/s Signals Over 250-km of Nondispersion-Shifted Fiber by Using a Spectral Filtering Method, IEEE Photonics Technology Letters, Dec. 1996, 1725-1727, vol. 8, No. 12.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-μm InGaAlAs Multiquantum Well Ridge Waveguide Distributed Feedback Lasers, IEEE Photonics Technology Letters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

* cited by examiner

Figure 1. Schematic of the Chirp Managed Laser based RZ-DPSK Transmitter

Figure 2. Bit sequence progression along the transmitter chain in Chirp Managed Laser RZ-DPSK source.

Figure 3. DFB electro-absorption modulator

Figure 4. The OSR and relative spectral position of the various frequency modulated levels in the 3 level signal output of the FM source.

US 7,474,859 B2

VERSATILE COMPACT TRANSMITTER FOR GENERATION OF ADVANCED MODULATION FORMATS

REFERENCE TO PENDING PRIOR PATENT APPLICATIONS

This patent application:

(i) is a continuation-in-part of pending prior U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM;

(ii) is a continuation-in-part of pending prior U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) is a continuation-in-part of pending prior U.S. patent application Ser. No. 11/441,944, filed May 26, 2006 by Daniel Mahgerefteh et al. for FLAT DISPERSION FREQUENCY DISCRIMINATOR (FDFD);

(iv) is a continuation-in-part of pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT;

(v) is a continuation-in-part of pending prior U.S. patent application Ser. No. 11/084,630, filed Mar. 18, 2005 by Daniel Mahgerefteh et al. for FLAT-TOPPED CHIRP INDUCED BY OPTICAL FILTER EDGE;

(vi) is a continuation-in-part of pending prior U.S. patent application Ser. No. 11/702,436, filed Feb. 5, 2007 by Kevin McCallion et al. for MULTI-RING RESONATOR IMPLEMENTATION OF OPTICAL SPECTRUM RESHAPER FOR CHIRP MANAGED LASER TECHNOLOGY;

(vii) is a continuation-in-part of pending prior U.S. patent application Ser. No. 11/084,633, filed Mar. 18, 2005 by Daniel Mahgerefteh et al. for METHOD AND APPARATUS FOR TRANSMITTING A SIGNAL USING SIMULTANEOUS FM AND AM MODULATION;

(viii) claims benefit of pending prior U.S. Provisional Patent Application Ser. No. 60/853,867, filed Oct. 24, 2006 by Kevin McCallion et al. for SPECTRAL RESPONSE MODIFICATION VIA SPATIAL FILTERING WITH OPTICAL FIBER; and (ix) claims benefit of pending prior U.S. Provisional Patent Application Ser. No. 60/789,863, filed Apr. 6, 2006 by Daniel Mahgerefteh et al. for VERSATILE COMPACT TRANSMITTER FOR GENERATION OF ADVANCED MODULATION FORMATS The nine above-identified patent applications are hereby incorporated herein by reference.

FIELD OF THE INVENTION

This invention relates to signal transmissions in general, and more particularly to the transmission of optical signals.

BACKGROUND OF THE INVENTION

The quality and performance of a digital fiber optic transmitter is determined by the distance over which the transmitted digital signal can propagate without severe distortions. The bit error rate (BER) of the signal is measured at a receiver after propagation through dispersive fiber and the optical power required to obtain a certain BER, typically $10^{-12}$, sometimes called the sensitivity, is determined. The difference in sensitivity at the output of the transmitter with the sensitivity after propagation is sometimes called the dispersion penalty. This is typically characterized by the distance over which a dispersion penalty reaches a level of ~1 dB. A standard 10 Gb/s optical digital transmitter, such as an externally modulated source, can transmit up to a distance of ~50 km in standard single mode fiber at 1550 nm before the dispersion penalty reaches the level of ~1 dB, which is sometimes called the dispersion limit. The dispersion limit is determined by the fundamental assumption that the digital signal is transform-limited, i.e., the signal has no time-varying phase across its bits and has a bit period of 100 ps, or 1/(bit rate), for the standard 10 Gb/s transmission. Another measure of the quality of a transmitter is the absolute sensitivity after fiber propagation.

Three types of optical transmitters are presently in use in prior art fiber optic systems: (i) directly modulated lasers (DML), (ii) Electroabsorption Modulated Lasers (EML), and (iii) Externally Modulated Mach Zhender (MZ) modulators. For transmission in standard single mode fiber at 10 Gb/s, and 1550 nm, it has generally been assumed that MZ modulators and EML can have the longest reach, typically reaching 80 km. Using a special coding scheme, sometimes referred to as phase-shaped duobinary, MZ transmitters can reach 200 km. On the other hand, directly modulated lasers (DML) typically reach <5 km because their inherent time-dependent chirp causes severe distortion of the signal after this distance.

By way of example, various systems for long-reach lightwave data transmission (>80 km at 10 Gb/s) through optical fibers which increase the reach of DML to >80 km at 10 Gb/s in single mode fiber are disclosed in (i) U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM, (ii) U.S. patent application Ser. No. 11/441,944, filed May 26, 2006 by Daniel Mahgerefteh et al. for FLAT DISPERSION FREQUENCY DISCRIMINATOR (FDFD) and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR, which patent applications are hereby incorporated herein by reference. The transmitter associated with these novel systems is sometimes referred to as a Chirp Managed Laser (CML™) by Azna LLC of Wilmington, Mass. In these new systems, a Frequency Modulated (FM) source is followed by an Optical Spectrum Reshaper (OSR) which uses the frequency modulation to increase the amplitude modulated signal and partially compensate for dispersion in the transmission fiber. In one embodiment, the frequency modulated source may comprise a Directly Modulated Laser (DML). The Optical Spectrum Reshaper (OSR), sometimes referred to as a frequency discriminator, can be formed by an appropriate optical element that has a wavelength-dependent transmission function, e.g., a filter. The OSR can be adapted to convert frequency modulation to amplitude modulation.

SUMMARY OF THE INVENTION

In the novel system of the present invention, the chirp properties of the frequency modulated source are utilized and then further reshaped by configuring the OSR to further extend the reach of a CML™ transmitter to over 250 km on standard single mode fiber at 10 Gb/s and 1550 nm. The novel system of the present invention combines, among other things, selected features of the systems described in (i) U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT, (ii) U.S. patent application Ser. No. 11/084,630, filed Mar. 18, 2005 by Daniel Mahgerefteh et al. for FLAT-TOPPED CHIRP INDUCED BY OPTICAL FILTER EDGE, (iii) U.S. patent application Ser. No. 11/702,436, filed Feb. 5, 2007 by Kevin McCallion et al. for MULTI-RING RESONATOR IMPLEMENTATION OF OPTICAL SPECTRUM RESHAPER FOR CHIRP MANAGED LASER TECHNOLOGY and (iv) U.S. patent application Ser. No. 11/084,633, filed Mar. 18, 2005 by Daniel Mahgerefteh et al. for METHOD AND APPARATUS FOR TRANSMITTING A SIGNAL USING SIMULTANEOUS FM AND AM MODULATION, which patent applications are hereby incorporated herein by reference.

More particularly, the present invention comprises a device for generating an optical differentially-phase-shift-keyed (DPSK) return-to-zero (RZ) signal, using a chirp managed laser of the sort described in the above-identified patent applications.

In another form of the present invention, there is provided a system for generating a return-to-zero differentially-phase-shift-keyed (RZ-DPSK) optical signal comprising:

a driver comprising an N-level digital multilevel transformer (DMT) configured to receive a two level digital electrical signal representing 1s and 0s and output a N-level electrical signal, wherein N>2;

an FM source configured to receive the N-level electrical signal output by the driver and generate an optical frequency modulated signal; and an optical spectrum reshaper (OSR) configured to receive the optical frequency modulated signal output by the FM source and generate the desired RZ-DPSK optical signal.

In another form of the present invention, there is provided a method for generating a return-to-zero differentially-phase-shift-keyed (RZ-DPSK) optical signal, the method comprising:

(1) receiving a two level digital electrical signal representing 1s and 0s and outputting a N-level electrical signal, wherein N>2;

(2) receiving the N-level electrical signal output and generating an optical frequency modulated signal; and (3) receiving the optical frequency modulated signal and generating the desired RZ-DPSK optical signal.

BRIEF DESCRIPTION OF THE DRAWINGS

These and other objects, features and advantages of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

The DPSK Format

In the DPSK format, an input digital electrical signal representing 1s and 0s is converted to an optical signal where the information is encoded in the phase of a continuous-wave (CW), constant-amplitude signal. In this DPSK format, the modulation rule is that, given an input random digital sequence of 1s and 0s bits, the phase of the CW signal is changed by $\pi$ for every occurrence of a 0 bit while the phase is unchanged for the occurrence of a 1 bit. As an example, consider the digital sequence and the resulting DPSK phase of the bits shown below in Table 1:

TABLE 1

| | |
|---|---|
| (a) Digital signal: | 1 1 1 0 1 0 0 1 0 1 0 0 0 1 1 0 1 0 1 1 0 1 1 . . . |
| (b) Phase of bits: | 0 0 $\pi$ $\pi$ 0 $\pi$ $\pi$ 0 0 $\pi$ 0 $\pi$ $\pi$ $\pi$ 0 0 . . . |
| (c) Amplitude of bits: | 1 1 –1 –1 1 –1 –1 1 1 –1 1 –1 –1 –1 . . . |
| (d) Intensity of bits: | 1 1 1 1 1 1 1 1 1 1 1 1 1 1 1 1 |

(1)

Here the amplitude refers to the optical electric field of the bit, which carries phase information, whereas intensity refers to the optical power in the bits, which does not carry phase information. The optical electric field representation of each bit is a complex number, whereas the optical intensity is always a real, positive number. The advantage of this modulation format is that it provides the same bit error rate as standard, on-off keying at a 3 dB smaller signal-to-noise ratio, thereby enabling transmission over a larger number of optical amplifiers, which translates to a longer transmission distance. This is because in the DPSK format, every bit carries energy, whereas in a non-return-to-zero on-off keying (OOK) scheme, only the 1 bits have energy; the 0 bits carry no energy.

The advantage of DPSK is realized by using a 1 bit delayed interferometer at the receiver together with a balanced receiver. The function of the 1 bit delayed interferometer is to convert the phase modulation of DPSK to amplitude modulation. This interferometer has two outputs: (1) the ADD output, where the 1 bit delayed version of bits are added together, and (2) the SUBTRACT output, where the 1 bit delayed version of bits are subtracted from each other. Since the input DPSK signal is split between the two arms of the interferometer, the power in each arm is reduced by a factor of 2. The function of the interferometer, which is usually a Mach-Zhender type, is shown below in an example in Table 2: here the amplitude sequence (c) is delayed by 1 bit in one arm of a Mach-Zhender interferometer to produce stream (d) which is made to interfere with the input in the Mach-Zhender so as to produce the ADD (e) and the SUBTRACT (f) outputs. The intensities of these two outputs are detected by a standard photodetector, which is not sensitive to the phase of the optical field and only measures optical power. A two port balanced receiver subtracts the detected photocurrents of the ADD and SUBTRACT ports, resulting in output (g), which is known in the art to have 3 dB higher sensitivity than a standard OOK transmitter:

TABLE 2

| | | |
|---|---|---|
| (c) Amplitude of bits: | ½× | 1 1 -1 -1 1 -1 -1 1 1 1 -1 1 -1 -1 -1 |
| (d) One bit delayed version: | ½× | 1 1 -1 -1 1 -1 -1 1 1 1 -1 1 -1 -1 -1 |
| (e) Amplitude of ADD port | | ...1 0 1 0 0 0 1 0 1 0 0 0 1 1... |
| (f) Amplitude of SUBTRACT port | | ...0 0 1 0 1 1 0 1 0 1 1 1 0 0 |
| (g) Output of balanced receiver (V) | | 1 -1 1 -1 -1 1 -1 -1 -1 -1 1 1 1 |

The bits are distinguished at the receiver by using a digitizer that assigns the bit value 1 if the output of the receiver, V, is above a certain voltage value sometimes called the decision threshold or 0 if the output voltage, V, is below the decision threshold. As is known in the art, the decision threshold for the DPSK modulation format is placed at 0 volts, so that the so-called "distance" between the 1 and 0 bits is now 2, i.e., the difference in voltage between the 1 and 0 bits is 1−(−1)=2, whereas the difference would be 1−0=1 for standard OOK, assuming the same average optical power. This factor of 2 difference allows the same bit error rate to be obtained at ½ of the optical signal-to-noise ratio (OSNR) as standard OOK, hence the 3 dB advantage of DPSK.

In a return-to-zero differential-phase shift-keying (RZ-DPSK) transmitter, the output of a CW laser is further modulated by a sinusoidal clock signal at a selected bit rate (e.g., 10 GHz), with 30%-50% duty cycle, in order to further improve the sensitivity at the receiver. Hence the output intensity is a constant intensity pulse train with 30-50% duty cycle at the bit rate, while the phases of the pulses follow the DPSK rule set forth above.

In the prior art, the RZ-DPSK transmitter typically comprises a CW laser, a first modulator to generate DPSK, and a second modulator to carve out the 30%-50% duty cycle pulses or higher sensitivity. The modulators used in the prior art are typically Mach-Zhender phase and/or amplitude modulators, which are bulky, require a high (i.e., >4-6 Vpp) drive voltage and therefore have high power consumption, which is not desirable.

DPSK and Chirp Managed Laser (CML)

In the present invention, a compact chirp managed laser (CML), which comprises an FM source and an optical spectrum reshaper (OSR), is used to generate RZ-DPSK signal without the use of external modulators.

Figure 1:
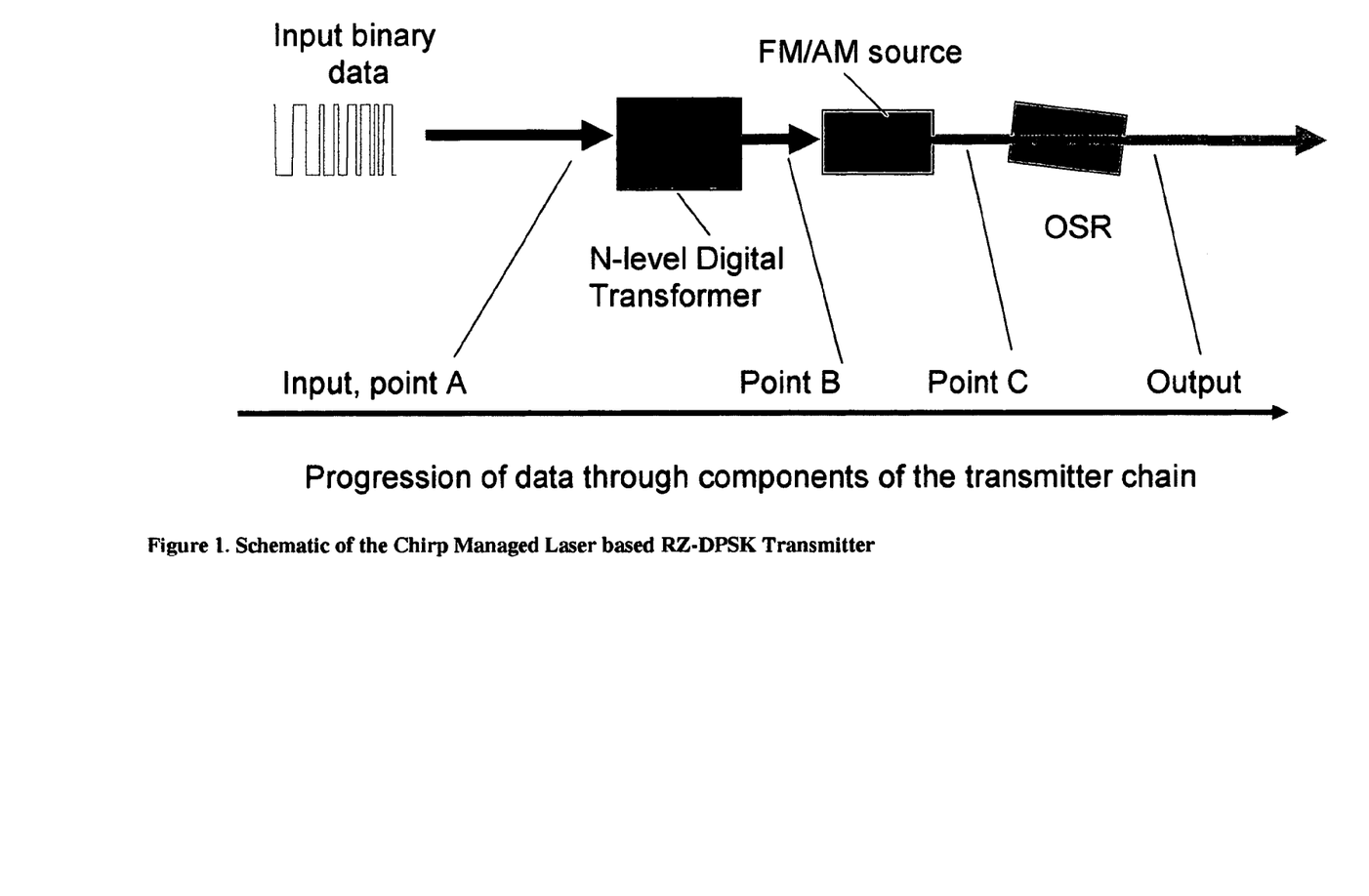
FIG. 1 is a schematic illustration of the Chirp Managed Laser-based RZ-DPSK Transmitter of the present invention.

FIG. 1 shows a schematic illustration of the novel apparatus. A binary electrical digital data stream is fed into a digital multilevel transformer (DMT) which converts the two level input of the binary electrical digital data stream to a three level output according to the procedure to be described below. The three level digital signal emerging from the DMT is then used to drive an FM source (e.g., a distributed feedback laser, also known as a DFB laser) which converts the input digital three level signal to an optical three level signal. In other words, the output of the DMT is used as the input to the CML apparatus. Both the optical frequency and optical intensity of the laser output will be modulated according to the three level driver signal output by the DMT.

The amplitude of the electrical signal output by the DMT is chosen so as to generate a prescribed frequency excursion and amplitude excursion whereby to produce the desired phase coding of the DPSK: (i) when a zero phase is desired, i.e., amplitude=+1, the driver amplitude is adjusted so as to produce a chirp $\Delta f=2/T$ at the output of the laser, where T is ½ the duration of the bit, e.g., 50 ps for a 50% duty cycle RZ signal at 10 Gb/s; (ii) when a π phase is desired in the coded DPSK output, i.e., amplitude=−1, chirp, the driver amplitude is made to generate a chirp $\Delta f=1/T$ at the output of the laser. Note that the phase shift across the zero bit is $\Delta \phi = 2\pi T \Delta f$, so that for a 50% duty cycle RZ-DPSK signal at 10 Gb/s, the chirp=20 GHz for a 0 phase shift (amplitude=+1) and the chirp =10 GHz for a π phase shift (amplitude=−1).

The optical output of the FM source is then passed through an optical spectrum reshaper (OSR), i.e., filter, which has two functions: (i) the OSR increases the amplitude modulation of the output signal, and (ii) the OSR converts the input adiabatic frequency excursion (output by the FM source) to a flat-topped chirp with nearly instantaneous, abrupt phase shifts near the null outputs of the signal.

Figure 2:
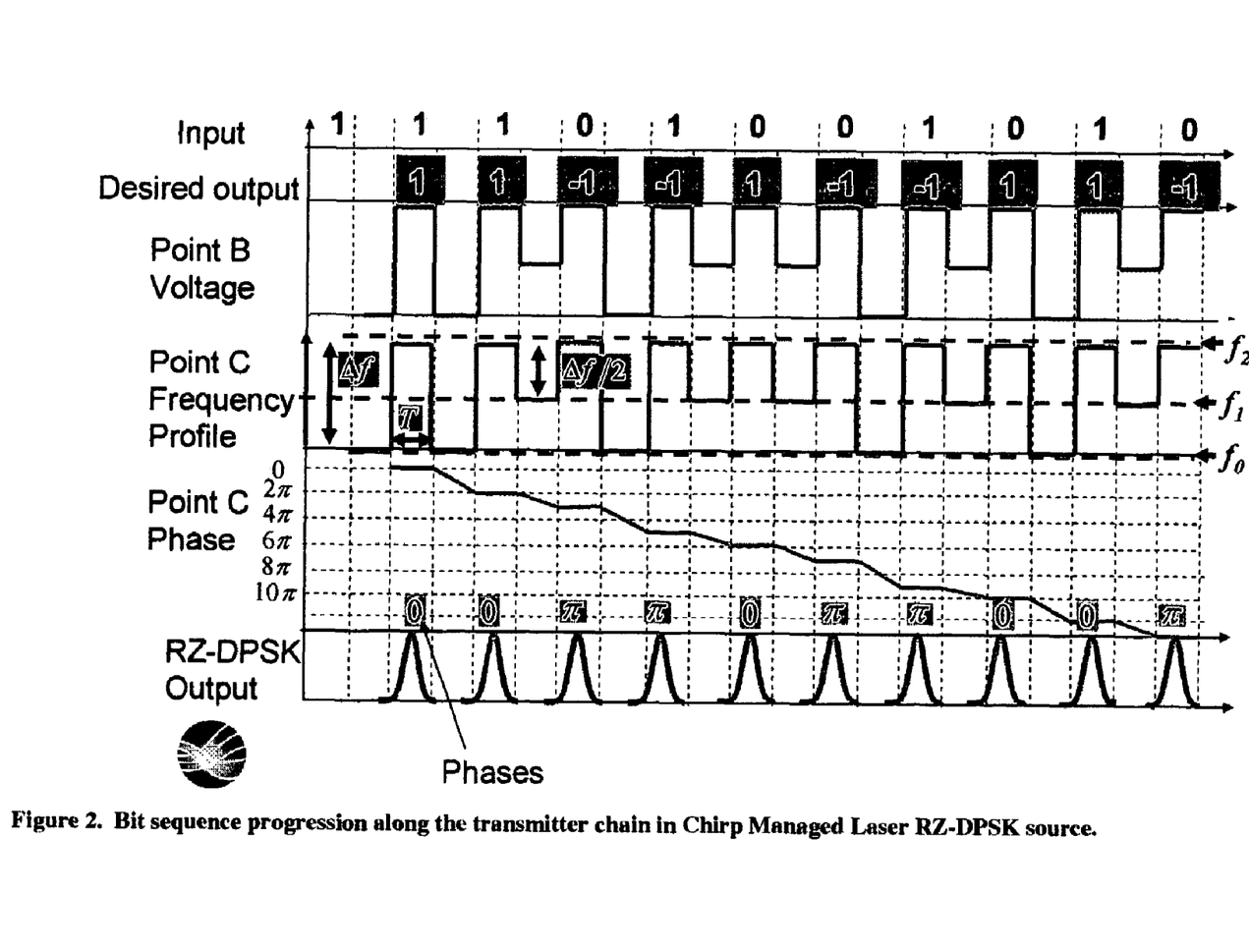
FIG. 2 shows a bit sequence progression along the transmitter chain in the Chirp Managed Laser RZ-DPSK source.

To further elucidate this novel approach, consider the input binary digital bit sequence:

$a_n = ...1 1 1 0 1 0 0 1 0 1 0 0 0 1 1 0 1 0 1 1 0 1 1$ at the input to the three level digital transformer (DMT). FIG. 2 shows the bit sequence, and the pulse shapes, at various points in the transmitter chain (i.e., the transmitter stages). The desired output sequence, $b_n$, which is labeled "desired output" in FIG. 2, is another binary digital sequence with two values, here taken to be +1 and −1. The sequence $b_n$ can be related to the input sequence $a_n$ according to the rule that the value of bit $b_n$ is changed from its previous value $b_{n-1}$ for every occurrence of a 0 bit in $a_n$, while it is left unchanged for the occurrence of a 1 bit in $a_n$. In a conventional RZ-DPSK transmitter, this sequence is generated by use of a differential encoder in combination with a Mach-Zhender modulator. In the present invention, the differential encoder is no longer needed. For the case that $b_n=+1$, or −1, this rule can be written as:

If $a_n=1$, then $b_n=b_{n-1}$

If $a_n=0$, then $b_n=-b_{n-1}$ (2)

The sequence $a_n$ is fed into a three-level digital transformer (DMT) which generates the pulse shape shown in FIG. 2 at point B, according to the following rule (in this example, the desired output pulses have a 50% duty cycle): (i) when the input bit is $a_n=1$, the signal at point B drops to 0 (changes by V), stays at the 0 value for 50% of the bit duration, 2T, and returns to the value V—the voltage drop, V, is adjusted according to the FM efficiency of the laser in order to generate a chirp equal to 2 times the bit rate frequency; $\Delta f=1/T$; (ii) when the input bit is a=0, the output drops to V/2, stays at that value for time T, and returns to the value V in order to generate a chirp equal to the bit rate frequency, i.e., $\Delta f=1/2T$.

This choice of voltage output guarantees the generation of the proper phase relation between bits at the output of a frequency modulated (FM) source, as described hereinbelow. The FM source, such as a DFB laser, is driven by the voltage pattern at point B, and generates a frequency and amplitude modulated output waveform shown at point C (frequency profile and phase profile, but amplitude profile not shown). The value of the drive voltage, V, is chosen to generate a frequency excursion which is equal to the bit rate of the digital signal, i.e., 10 GHz for a 10 Gb/s data stream with a 50% duty cycle. More generally, the full frequency excursion, $\Delta f$, is chosen such that $\Delta f \times T=1$, where T is the duration of the 0 in the return-to-zero signal, i.e., ½ the bit period for a 50% duty cycle RZ pulse sequence. The voltage is determined by the so-called FM efficiency of the source, $\eta_{FM}$, in GHz/V—in other words, $\Delta f=\eta_{FM} V$. The phase of the optical signal at the output of the DFB laser is the time integral of the frequency excursion as shown in FIG. 2. For example, when $a_n=1$, and a 0 phase is desired, the full frequency excursion $\Delta f=20$ GHz is applied for a 10 Gb/s return-to-zero (RZ) data stream with a 50% duty cycle, so that the phase of the frequency modulated signal slips by 20 GHz×2π×50 ps=2π. When the input bit is $a_n$=1, the three level digital, transformer (DMT) produces ½ the voltage, generating 10 GHz frequency excursion for the case of 10 Gb/s RZ. In this case, the phase of the signal slips by 10 GHz×2π×50 ps=π, and the resulting adjacent pulses will have a π phase shift between them, as desired.

The output of the FM source (i.e., the laser) is passed through an optical spectrum reshaper (OSR), i.e., a filter, which increases the amplitude excursion and flattens the chirp, as described in the aforementioned patent applications relating to chirp managed lasers. As shown in FIG. 2, the intensity at the output of the OSR is an RZ-DPSK signal where each bit carries equal energy and the data is encoded in the phase of the bits.

The amplitude of the resulting pulses at the output of the DFB is not shown in FIG. 2, but, as is well known in the art of chirp-managed lasers, typically follows the frequency excursion.

Figure 3:
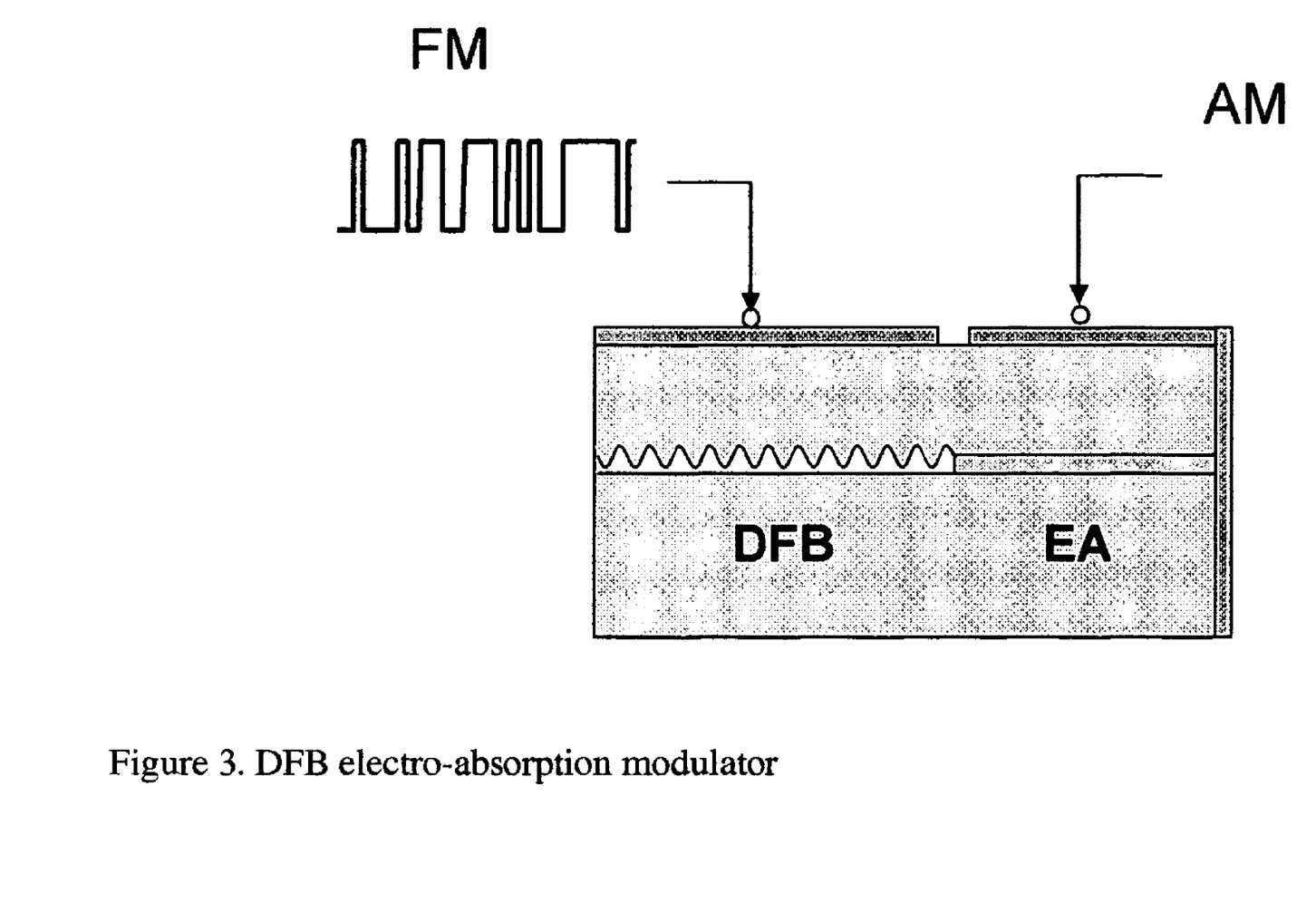
FIG. 3 shows a DFB laser with an electro-absorption modulator.

In another embodiment of the present invention, the FM source has independent control for amplitude and frequency excursion. For example, a DFB laser can be used for generating frequency modulation and an electro-absorption (EA) modulator, which follows the output of the laser, can be used for amplitude modulation and pulse carving. The DFB and EA can be integrated on the same chip, as shown in FIG. 3.

Independent control of frequency (FM) and amplitude (AM) can be used to generate a DPSK signal as follows. The amplitude modulation, generated by the EA modulator, for example, is programmed to provide the desired amplitude modulation after the OSR. For example, the amplitude modulation can be reduced for bits having large frequency excursion and increased for bits having small frequency modulation, such that the output amplitude of high level and low levels after OSR are the same. The output amplitude after the OSR follows the following equation:

$$AM(t)+FM(t)\times(OSR\ slope)=constant \qquad (3)$$

Here AM is amplitude modulation depth in dB, which is defined as the ratio of the 1 level to the 0 level, FM is the frequency modulation in GHz, and slope is the OSR slope in dB/GHz. In the example above, if the FM source has independent control of output amplitude, the AM component would be programmed to output voltage $V_{AM}$ when the frequency is at half the maximum, i.e., Δf/2, and the amplitude is set to $V_{AM}/2$ when the frequency excursion is at maximum, i.e., Δf. Here $V_{AM}$ is chosen to provide the appropriate amplitude response, and depends on the AM slope efficiency of the source.

In another example, RZ-DPSK is generated at the bit rate, e.g., 10 Gb/s, using a DFB/EA combination as the FM source and an OSR, in order to reduce the required maximum chirp from twice the bit rate frequency, i.e., 20 GHz for 10 Gb/s signal to the bit rate frequency, i.e., 10 GHz for 10 Gb/s signal. This is achieved by generating the desired phase shift in full bit period, i.e., 100 ps for a 10 Gb/s signal. The EA modulator generates the desired RZ pulse shape with 50% duty cycle by modulating the amplitude of the output of the DFB. For example, when $a_n$=1, and a 0 phase is desired, the full frequency excursion Δf=10 GHz is applied for a 10 Gb/s signal, so that the phase of the frequency modulated signal slips by 10 GHz×2π×100 ps=2π. When the input bit is $a_n$=0, the three level digital transformer produces ½ the voltage, generating 5 GHz frequency excursion. In this case, the phase of the signal slips by 5 GHz×2π×100 ps=π, and the resulting adjacent pulses will have a π phase shift between them, as desired. The output of the FM source is passed through an optical spectrum reshaper (OSR) filter which increases the amplitude excursion and flattens the chirp, as described in the above-identified patent applications relating to chirp managed lasers (CML).

Figure 4:
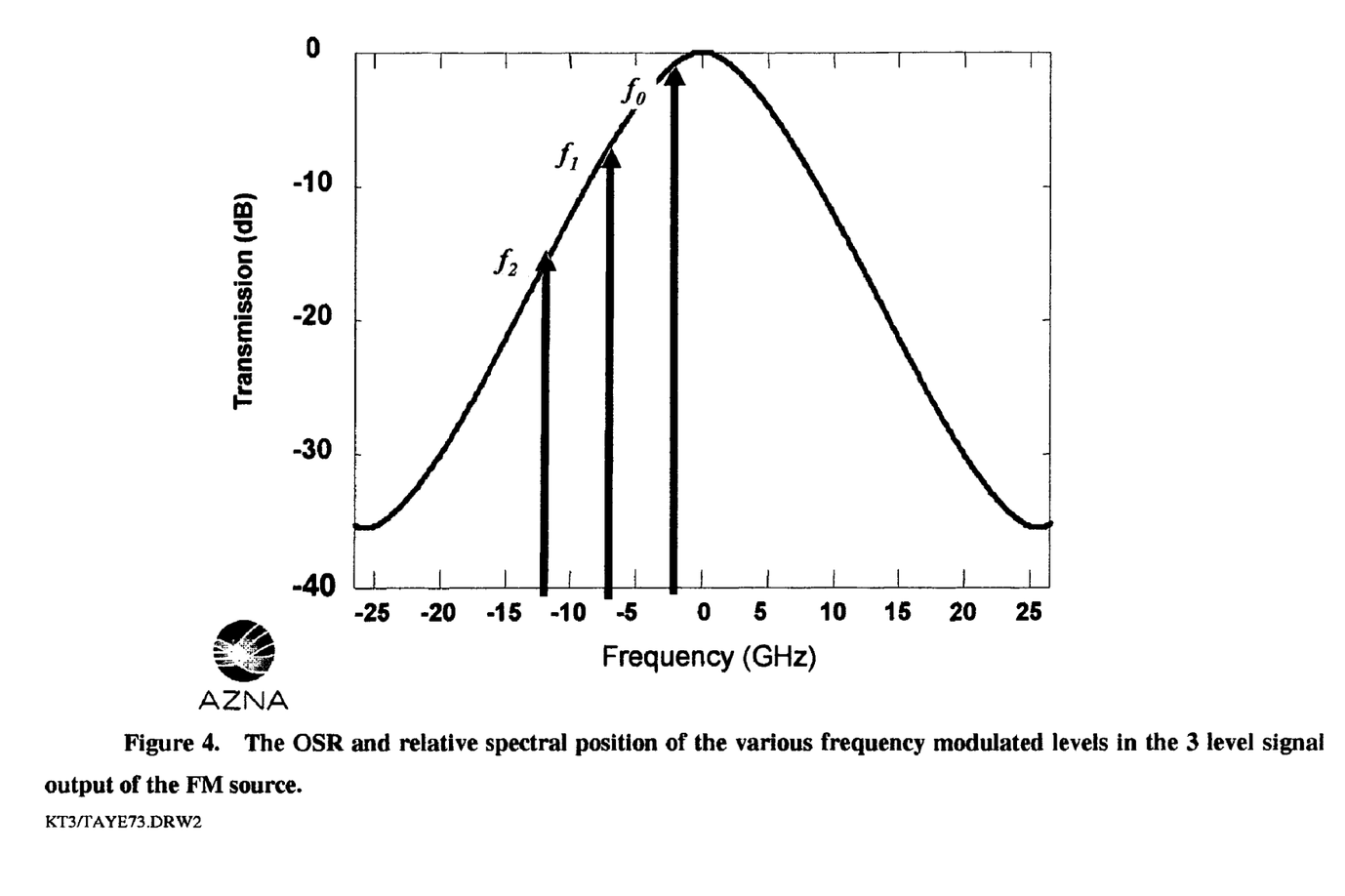
FIG. 4 shows an OSR and relative spectral position of the various frequency modulated levels in a three level signal output of an FM source.

FIG. 4 shows an example of an optical spectrum reshaper (OSR) and the spectral positions of the various frequency values at the output of the FM source. Here the peak frequency, $f_0$, which corresponds to the highest amplitude, is aligned with a relatively low loss point on the OSR, while the middle frequency $f_1$ is aligned to have higher loss (~10 dB). The frequency $f_2$ suffers higher loss because it is a lower frequency (as shown in FIG. 4). Ideally the signal levels at the output of the OSR will be such that the 0 energy in the $f_1$ level and $f_2$ levels will be negligible, e.g., <-10 dB below the energy in the peak of the 1s. In this example, the OSR is used at its transmission edge and is also bandwidth limiting. A variety of OSR shapes can introduce discrimination between the various frequency components to generate the desired amplitude response after the OSR.

Importantly, it should be noted that a key function of the OSR edge is the transformation of the adiabatic chirp at the output of the FM source to flat-top chirp with abrupt phase shifts at the 0s, as has been described in (i) U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT and (ii) U.S. patent application Ser. No. 11/084,630, filed Mar. 18, 2005 by Daniel Mahgerefteh et al. for FLAT-TOPPED CHIRP INDUCED BY OPTICAL FILTER EDGE, which patent applications are hereby incorporated herein by reference. The resulting uniform phase generated by the transfer function of the OSR is important in generating a RZ-DPSK signal with improved sensitivity.

Generation Of RZ-OPSK

Note that the same concept can be generalized to produce return-to-zero quadrature phase shift keying (RZ-QPSK), for which the information is coded into four possible phases {0, π/2, π, -π/2}. The corresponding complex field amplitudes in this case are {1, i, -1, -i}. In this case, the multilevel digital transformer produces a four level signal, $V_k$, such that:

$$2\pi\Delta f_k \times T = \{2\pi, \pi/2, \pi, 3\pi/2\} \qquad (4)$$

The desired frequency excursions will therefore be $\Delta f_k$={1/T, 1/4T, 1/2T, 3/4T} for corresponding phases of {0, π/2, π, -π/2}. For example, to generate RZ-DQPSK for a 10 Gb/s RZ signal with 50% duty cycle, the amplitudes of the DMT are adjusted so as to generate frequency excursions of 20 GHz for a bit requiring 0 phase shift, 5 GHz for a bit requiring a π/2 phase shift, 10 GHz for a bit requiring a π phase shift, and 15 GHz for a bit requiring 3π/2 phase shift. The OSR transmission is chosen such that the low levels during the 0 part of the bits is <-10 dB below the high level. In the case that the source has independent FM and AM modulation, the amplitude is adjusted to provide constant amplitude for the output pulses. As is clear from the above two examples, a variety of multilevel phase coded signals can be generated by using the chirp managed laser scheme described above by adjusting the frequency excursion to generate the desired phase in the desired bit.

MODIFICATIONS

It will be understood that many changes in the details, materials, steps and arrangements of parts, which have been herein described and illustrated in order to explain the nature of the invention, may be made by those skilled in the art without departing from the principles and scope of the present invention.

What is claimed is:

1. A system for generating a return-to-zero differentially-phase-shift-keyed (RZ-DPSK) optical signal comprising:
    a driver comprising an N-level digital multilevel transformer (DMT) configured to receive a two level digital electrical signal representing 1s and 0s and output a N-level electrical signal, wherein N>2;
    an FM source configured to receive the N-level electrical signal output by the driver and generate an optical frequency modulated signal; and
    an optical spectrum reshaper (OSR) configured to receive the optical frequency modulated signal output by the FM source and generate the desired RZ-DPSK optical signal.

2. A system according to claim 1 wherein the output of the driver is adjusted such that the frequency excursion ($\Delta f$) generated by the FM source is (i) substantially equal to twice the bit rate frequency for an input 1 bit of the two level digital electrical signal, and (ii) equal to the bit rate frequency for an input 0 bit of the two level digital electrical signal.

3. A system according to claim 1 wherein the amplitude of the output of the driver is chosen so as to generate a prescribed frequency excursion and amplitude excursion, whereby to produce the desired phase coding of the DPSK, such that: (i) when a zero phase (amplitude=+1) is desired, the driver amplitude is adjusted so as to produce a chirp $\Delta f=1/T$ at the output of the FM source, where T is ½ the duration of the bit; and (ii) when a $\pi$ phase (amplitude=−1) is desired, the driver amplitude is adjusted so as to produce a chirp $\Delta f=1/2T$ at the output of the FM source.

4. A system according to claim 3 wherein, when a zero phase is desired for a 50% duty cycle RZ signal at 10 Gb/s, the driver amplitude is adjusted so as to produce a chirp of $\Delta f=1/T$ at the output of the FM source, where T=50 ps and $\Delta f=20$ GHz.

5. A system according to claim 3 wherein, when a $\pi$ phase is desired for a 50% duty cycle RZ signal at 10 Gb/s, the driver amplitude is adjusted so as to produce a chirp of $\Delta f=1/2T$ at the output of the FM source, where T=50 ps and $\Delta f=10$ GHz.

6. A system according to claim 1 wherein N=3.

7. A system according to claim 6, wherein the amplitude of the output of the driver is chosen so as to generate a prescribed frequency excursion and amplitude excursion, whereby to produce the desired phase coding of the QPSK, such that: (i) when a zero phase (complex amplitude=+1) is desired, the driver amplitude is adjusted so as to produce a chirp $\Delta f=1/T$ at the output of the FM source, where T is ½ the duration of the bit, (ii) when a $\pi/2$ phase (complex amplitude=i) is desired, the driver amplitude is adjusted so as to produce a chirp $\Delta f=1/4T$ at the output of the FM source, (iii) when a $\pi$ phase (complex amplitude=−1) is desired, the driver amplitude is adjusted so as to produce a chirp $\Delta f=1/2T$ at the output of the FM source, and (iv) when a $3\pi/2$ phase (complex amplitude=−i) is desired, the driver amplitude is adjusted so as to produce a chirp $\Delta f=3/4T$ at the output of the FM source.

8. A system according to claim 7 wherein, when a $\pi/2$ phase is desired for a 50% duty cycle RZ signal at 10 Gb/s, the driver amplitude is adjusted so as to produce a chirp of $\Delta f=1/4T$ at the output of the FM source, where T=50 ps and $\Delta f=5$ GHz.

9. A system according to claim 7 wherein, when a $3\pi/2$ phase is desired for a 50% duty cycle RZ signal at 10 Gb/s, the driver amplitude is adjusted so as to produce a chirp of $\Delta f=3/4T=$ at the output of the FM source, where T 50 ps and $\Delta f=15$ GHz.

10. A system according to claim 1 wherein N=4.

11. A system according to claim 1 wherein the FM source comprises a laser.

12. A system according to claim 11 wherein the laser is a distributed feedback (DFB) laser.

13. A system according to claim 1 wherein the FM source provides both amplitude excursion and frequency excursion, and further wherein the FM source is configured to provide independent controls for the amplitude excursion and the frequency excursion.

14. A system according to claim 13 wherein the FM source comprises a distributed feedback (DFB) laser followed by an electro-absorption (EA) modulator, wherein the DFB laser is used for generation of frequency modulation and the EA modulator is used for amplitude modulation and pulse carving.

15. A system according to claim 14 wherein the DFB laser and the EA modulator are integrated on the same chip.

16. A system according to claim 1 wherein the OSR comprises a filter.

17. A system according to claim 16 wherein the FM source provides both amplitude excursion and frequency excursion, and the filter: (i) increases the amplitude modulation of the signal output by the FM source, and (ii) converts the adiabatic frequency excursion of the FM source to a flat-topped chirp with nearly instantaneous, abrupt phase shifts near the null outputs of the signal.

18. A method for generating a return-to-zero differentially-phase-shift-keyed (RZ-DPSK) optical signal, the method comprising:
    (1) receiving a two level digital electrical signal representing 1s and 0s and outputting a N-level electrical signal, wherein N>2;
    (2) receiving the N-level electrical signal output and generating an optical frequency modulated signal; and
    (3) receiving the optical frequency modulated signal and generating the desired RZ-DPSK optical signal.

19. A method according to claim 18 wherein:
    step (1) is performed by a driver comprising an N-level digital multilevel transformer (DMT) configured to receive a two level digital electrical signal representing 1s and 0s and output a N-level electrical signal, wherein N>2.

20. A method according to claim 18 wherein:
    step (2) is performed by an FM source configured to receive the N-level electrical signal output by the driver and generate an optical frequency modulated signal.

21. A method according to claim 18 wherein:
    step (3) is performed by an optical spectrum reshaper (OSR) configured to receive the optical frequency modulated signal output by the FM source and generate the desired RZ-DPSK optical signal.

22. A method according to claim 18 wherein:
    step (1) is performed by a driver comprising an N-level digital multilevel transformer (DMT) configured to receive a two level digital electrical signal representing 1s and 0s and output a N-level electrical signal, wherein N>2;

step (2) is performed by an FM source configured to receive the N-level electrical signal output by the driver and generate an optical frequency modulated signal; and step (3) is performed by an optical spectrum reshaper (OSR) configured to receive the optical frequency modulated signal output by the FM source and generate the desired RZ-DPSK optical signal.

23. A method according to claim 22 wherein the output of the driver is adjusted such that the frequency excursion ($\Delta f$) generated by the FM source is (i) substantially equal to twice the bit rate frequency for an input 1 bit of the two level digital electrical signal, and (ii) equal to the bit rate frequency for an input 0 bit of the two level digital electrical signal.

24. A method according to claim 22 wherein the amplitude of the output of the driver is chosen so as to generate a prescribed frequency excursion and amplitude excursion, whereby to produce the desired phase coding of the DPSK, such that: (i) when a zero phase (amplitude=+1) is desired, the driver amplitude is adjusted so as to produce a chirp $\Delta f=1/T$ at the output of the FM source, where T is ½ the duration of the bit; and (ii) when a $\pi$ phase (amplitude=−1) is desired, the driver amplitude is adjusted so as to produce a chirp $\Delta f=1/2T$ at the output of the FM source.

25. A method according to claim 24 wherein, when a zero phase is desired for a 50% duty cycle RZ signal at 10 Gb/s, the driver amplitude is adjusted so as to produce a chirp of $\Delta f=1/T$ at the output of the FM source, where T=50 ps and $\Delta f=20$ GHz.

26. A method according to claim 24 wherein, when a $\pi$ phase is desired for a 50% duty cycle RZ signal at 10 Gb/s, the driver amplitude is adjusted so as to produce a chirp of $\Delta f=1/2T$ at the output of the FM source, where T=50 ps and $\Delta f=10$ GHz.

27. A method according to claim 22 wherein N=3.

28. A method according to claim 27, wherein the amplitude of the output of the driver is chosen so as to generate a prescribed frequency excursion and amplitude excursion, whereby to produce the desired phase coding of the QPSK, such that: (i) when a zero phase (complex amplitude=+1) is desired, the driver amplitude is adjusted so as to produce a chirp $\Delta f=1/T$ at the output of the FM source, where T is ½ the duration of the bit, (ii) when a $\pi/2$ phase (complex amplitude=−i) is desired, the driver amplitude is adjusted so as to produce a chirp $\Delta f=1/4T$ at the output of the FM source, (iii) when a $\pi$ phase (complex amplitude=−1) is desired, the driver amplitude is adjusted so as to produce a chirp $\Delta f=1/2T$ at the output of the FM source, and (iv) when a $3\pi/2$ phase (complex amplitude=−i) is desired, the driver amplitude is adjusted so as to produce a chirp $\Delta f=3/4T$ at the output of the FM source.

29. A method according to claim 28 wherein, when a $\pi/2$ phase is desired for a 50% duty cycle RZ signal at 10 Gb/s, the driver amplitude is adjusted so as to produce a chirp of $\Delta f=1/4T$ at the output of the FM source, where T=50 ps and $\Delta f=5$ GHz.

30. A method according to claim 28 wherein, when a $3\pi/2$ phase is desired for a 50% duty cycle RZ signal at 10 Gb/s, the driver amplitude is adjusted so as to produce a chirp of $\Delta f=3/4T$ at the output of the FM source, where T=50 ps and $\Delta f=15$ GHz.

31. A method according to claim 22 wherein N=4.

32. A method according to claim 22 wherein the FM source comprises a laser.

33. A method according to claim 32 wherein the laser is a distributed feedback (DFB) laser.

34. A method according to claim 22 wherein the FM source provides both amplitude excursion and frequency excursion, and further wherein the FM source is configured to provide independent controls for the amplitude excursion and the frequency excursion.

35. A method according to claim 34 wherein the FM source comprises a distributed feedback (DFB) laser followed by an electro-absorption (EA) modulator, wherein the DFB laser is used for generation of frequency modulation and the EA modulator is used for amplitude modulation and pulse carving.

36. A method according to claim 35 wherein the DFB laser and the EA modulator are integrated on the same chip.

37. A method according to claim 22 wherein the OSR comprises a filter.

38. A method according to claim 37 wherein the FM source provides both amplitude excursion and frequency excursion, and the filter: (i) increases the amplitude modulation of the signal output by the FM source, and (ii) converts the adiabatic frequency excursion of the FM source to a flat-topped chirp with nearly instantaneous, abrupt phase shifts near the null outputs of the signal.

* * * * *

UNITED STATES PATENT AND TRADEMARK OFFICE
CERTIFICATE OF CORRECTION

PATENT NO. : 7,474,859 B2  Page 1 of 1
APPLICATION NO. : 11/784395
DATED : January 6, 2009
INVENTOR(S) : Mahgerefteh et al.

It is certified that error appears in the above-identified patent and that said Letters Patent is hereby corrected as shown below:

On the Title Page, Item (56)
References Cited, Other Publications, Koch T. L., change "Nature of Wavelength Chriping" to --Nature of Wavelength Chirping--
References Cited, Other Publications, Yu, et al., change "Feb. 199" to --Feb. 1999--

Column 8
Line 56, change "RZ-DQPSK" to --RZ-DPSK--

Column 9
Line 56, change "QPSK" to --DPSK--

Signed and Sealed this

Fourteenth Day of September, 2010

David J. Kappos
*Director of the United States Patent and Trademark Office*